(12) United States Patent
Horn et al.

(10) Patent No.: US 7,813,590 B2
(45) Date of Patent: Oct. 12, 2010

(54) SYSTEM AND METHOD FOR DISPLAYING AN IN-VIVO IMAGE STREAM

(75) Inventors: Eli Horn, Kiryat Motzkin (IL); Hagai Krupnik, Nofit (IL)

(73) Assignee: Given Imaging Ltd., Yoqneam (IL)

( * ) Notice: Subject to any disclaimer, the term of this patent is extended or adjusted under 35 U.S.C. 154(b) by 1189 days.

(21) Appl. No.: 11/430,185

(22) Filed: May 9, 2006

(65) Prior Publication Data
US 2006/0285732 A1   Dec. 21, 2006

Related U.S. Application Data

(60) Provisional application No. 60/680,526, filed on May 13, 2005.

(51) Int. Cl.
*G06K 9/36* (2006.01)
(52) U.S. Cl. ........................ 382/284; 382/128
(58) Field of Classification Search .................. 382/284
See application file for complete search history.

(56) References Cited

U.S. PATENT DOCUMENTS

| | | | | |
|---|---|---|---|---|
| 5,138,460 A * | 8/1992 | Egawa | 348/239 |
| 5,331,551 A * | 7/1994 | Tsuruoka et al. | 382/128 |
| 5,547,455 A * | 8/1996 | McKenna et al. | 600/113 |
| 5,649,032 A * | 7/1997 | Burt et al. | 382/284 |
| 5,764,809 A * | 6/1998 | Nomami et al. | 382/284 |
| 5,796,861 A * | 8/1998 | Vogt et al. | 382/128 |
| 5,800,341 A * | 9/1998 | McKenna et al. | 600/109 |
| 5,838,837 A * | 11/1998 | Hirosawa et al. | 382/284 |
| 5,953,146 A * | 9/1999 | Shelby | 398/131 |
| 6,261,226 B1 * | 7/2001 | McKenna et al. | 600/109 |
| 6,346,940 B1 * | 2/2002 | Fukunaga | 345/427 |
| 6,424,752 B1 * | 7/2002 | Katayama et al. | 382/284 |
| 6,532,036 B1 * | 3/2003 | Peleg et al. | 348/36 |
| 6,549,681 B1 * | 4/2003 | Takiguchi et al. | 382/294 |
| 6,720,997 B1 * | 4/2004 | Horie et al. | 348/218.1 |
| 6,744,931 B2 * | 6/2004 | Komiya et al. | 382/284 |
| 6,785,410 B2 * | 8/2004 | Vining et al. | 382/128 |
| 6,947,039 B2 * | 9/2005 | Gerritsen et al. | 345/419 |
| 6,947,059 B2 * | 9/2005 | Pierce et al. | 345/629 |
| 7,011,625 B1 * | 3/2006 | Shar | 600/109 |
| 7,162,102 B2 * | 1/2007 | Cahill et al. | 382/288 |
| 7,381,183 B2 * | 6/2008 | Hale et al. | 600/117 |
| 7,609,910 B2 * | 10/2009 | Geiger et al. | 382/276 |
| 2002/0109774 A1 * | 8/2002 | Meron et al. | 348/74 |
| 2002/0190980 A1 * | 12/2002 | Gerritsen et al. | 345/419 |
| 2003/0028078 A1 * | 2/2003 | Glukhovsky | 600/109 |
| 2003/0076406 A1 * | 4/2003 | Peleg et al. | 348/36 |
| 2003/0113035 A1 * | 6/2003 | Cahill et al. | 382/284 |
| 2004/0169726 A1 * | 9/2004 | Moustier et al. | 348/207.1 |
| 2004/0210105 A1 * | 10/2004 | Hale et al. | 600/101 |
| 2004/0228508 A1 * | 11/2004 | Shigeta | 382/124 |
| 2004/0249247 A1 * | 12/2004 | Iddan | 600/170 |
| 2005/0008254 A1 * | 1/2005 | Ouchi et al. | 382/284 |
| 2005/0151730 A1 * | 7/2005 | Lobregt | 345/419 |
| 2005/0168616 A1 * | 8/2005 | Rastegar et al. | 348/335 |
| 2005/0226483 A1 * | 10/2005 | Geiger et al. | 382/128 |
| 2007/0161853 A1 * | 7/2007 | Yagi et al. | 600/109 |

* cited by examiner

*Primary Examiner*—Sath V Perungavoor
(74) *Attorney, Agent, or Firm*—Pearl Cohen Zedek Latzer LLP

(57) ABSTRACT

The present invention relates to a system and method for displaying an image stream captured by an in vivo imaging device and for displaying an image stream in a consolidated manner.

15 Claims, 2 Drawing Sheets

SYSTEM AND METHOD FOR DISPLAYING AN IN-VIVO IMAGE STREAM

CROSS REFERENCE TO RELATED APPLICATIONS

This application claims the benefit of U.S. Provisional Application Ser. No. 60/680,526, filed on May 13, 2005.

FIELD OF THE INVENTION

The present invention relates to a system and method for displaying an image stream captured by an in vivo imaging device; more specifically, to a system and method for displaying an image stream in a consolidated manner.

BACKGROUND OF THE INVENTION

Devices and methods for sensing of passages or cavities within a body, and for gathering information (e.g., image data, pH data, temperature information, pressure information), are known in the art. Such known devices may include, inter alia, swallowable imaging devices that may be autonomous and may travel through the gastrointestinal (GI) passively by, for example, natural peristaltic motion. Images captured by such devices may be transmitted, for example, by wireless transmission to an external receiving/recording, and may be subsequently displayed, typically as an image stream. Sometimes the image stream may be displayed as a movie.

SUMMARY OF THE INVENTION

According to some embodiments of the present invention, an image stream may be constructed that may present a progression of images captured along a body lumen. According to one embodiment of the present invention, the rate of change of scenery in the image stream may be regulated. According to another embodiment of the present invention, the image stream may display all image information captured while reducing/eliminating redundancy. The image stream, according to an embodiment of the invention, may reduce viewing time, increase the field of view of an image frame and provide more comfortable viewing, for example by providing a steady view through a body lumen without redundant information and without loosing any new information.

According to some embodiments of the present invention, consolidated image frames may be deformed to a standard shape and size. According to other embodiments of the present invention a defined central region of the consolidated image may be maintained as is without deformation. According to yet other embodiments of the present invention, the streaming rate of display may be regulated based on the content of the current image frame displayed.

BRIEF DESCRIPTION OF THE DRAWINGS

The present invention will be understood and appreciated more fully from the following detailed description taken in conjunction with the drawings in which.

Figure 1:
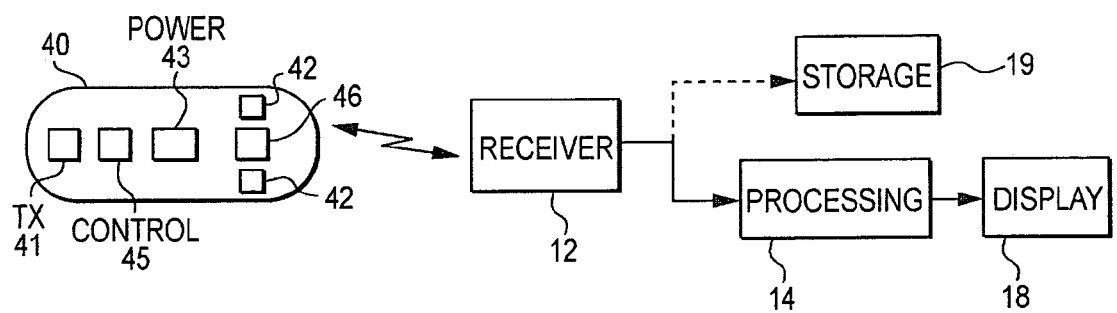
FIG. 1 shows a schematic diagram of an in vivo imaging system according to one embodiment of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

The device, system and method of the present invention may be used with an imaging system or device such as that shown in FIG. 1 and/or described in U.S. Pat. No. 7,009,634 entitled "Device For In Vivo Imaging", which is hereby incorporated by reference in its entirety. In an exemplary embodiment, the system comprises a capsule 40 having an imager 46, for capturing images, an illumination source 42, for illuminating the body lumen, a controller 345 for controlling the operation of capsule 40 and a transmitter 41, for transmitting image and possibly other information to a receiving device 12. Typically, located outside the patient's body in one or more locations are an image receiver 12, typically including an antenna or antenna array (not shown), an image receiver storage unit (not shown), a data processor 14, a data processor storage unit 19, and an image monitor 18, for displaying, inter alia, images recorded by the capsule 40. In some examples controller 45 may have processing capability. However, the device, system and method according to the present invention may be used with any device providing data from a body lumen or cavity. For example, the device, system and method of the present invention may be used with imaging devices using cameras other than CMOS imaging cameras. In alternate embodiments, a known imaging camera of another type such as a CCD may be used. A further example of an imaging system and device with which the system and method of the present invention may be used is described in U.S. Pat. No. 5,604,531 entitled "In Vivo Video Camera System," which is incorporated herein by reference in its entirety. In further embodiments, the system and method of the present invention may be used with devices and systems capturing information other than image information within the human body; for example, pressure or pH information, information on the location of a transmitting device, or other information.

Autonomous in-vivo imaging device that may passively traverse, for example, the GI tract may advance/progress through one or more body lumens of the GI tract in an orderly, substantially predictable, and/or smooth fashion and/or at a regulated/nearly consistent rate, and/or at a steady pace. As such an imaging device, capturing images at a fix rate may produce an image stream that may display the entire body lumen in a steady stream or steady periodic intervals of the body lumen. An example of such a lumen may be the small intestine where the body lumens walls may substantially hug the in-vivo imaging device so as to maintain its orientation with respect to the body lumen wall and the smooth periodic peristaltic pressure waves may advance the imaging device down stream in a steady predictable fashion. Other body lumens in addition to the small intestine may promote smooth advancement of an in-vivo imaging device.

In other body lumens the progression of the device may be chaotic/random/difficult to predict and may not facilitate collection of data in an orderly fashion or may not result in an orderly scanning of the entire body lumen and/or periodic intervals of the body lumen. For example, an in-vivo device may linger in one or more locations or sections of the body lumen, for example, for an extended period of time and subsequently rapidly progress through another section of the body lumen. Image data that may be captured at a fixed periodic rate may be redundant in the section where the device may have lingered and may be sparse in the section where the device may have progressed rapidly. An example of such a lumen may be the colon and/or the stomach and/or other voluminous body lumens. The colon and stomach may generally have a larger diameter than for example, the small intestine, and may not facilitate continuously maintaining its orientation with respect to the body lumen wall. In addition, the peristaltic motion of the colon and or stomach may be erratic and/or may occur at much lower frequencies. In other examples, stagnation and changes in orientation of the in vivo device may also occur in the small intestine and/or in the esophagus. Other body lumens may result in unpredictable and/or unsteady advancement of an imaging device.

Reviewing an image stream captured from an in-vivo device passively traversing through a body lumen, e.g. a colon and/or stomach may be cumbersome and time consuming due to the numerous repetitions of image data in certain sections and fast progression in other sections. For example in one section of the body lumen, a lot or a redundant amount of image data may be captured, while in another section little data may be captured. In addition, while viewing such an image stream it may be difficult to estimate the progression rate through the body lumen or to correlate between the frame capture rate and the advancement through the body lumen due to the erratic nature of the progression.

It may be helpful to consolidate two or more images in sections where the in-vivo device may have lingered while maintaining, for example, original image frames in areas where there was a significant advancement of the in-vivo imaging device. According to one embodiment of the present invention, a revised image stream consisting of partially consolidated image frames and partially original image frames may be constructed. In another embodiment of the present invention, a revised image stream may consist of a stream of consolidate image data where each consolidate image frame in the revised image stream and/or the consolidated image stream may be a consolidation of two or more images.

According to some embodiments of the present invention, a revised image stream may be constructed that may shorten the visualization time required to review the image stream and that may show a smoother and/or more steady progression of images captured along a body lumen. According to one embodiment of the present invention, the rate of change of scenery in the image stream may be regulated. According to another embodiment of the present invention, the revised image stream may display all image information captured while reducing/eliminating redundancy. The revised image stream may reduce viewing time, and provide more comfortable viewing, for example by providing a steady view through a body lumen without redundant information and without loosing any new information.

According to one embodiment of the present invention, consecutive frames of an image stream may be checked for potentially overlapping areas. An image frame, e.g. image frame n+1 may be compared to, for example, image frame n, where image frame n may be referred to as a reference image frame. In some examples, transformation, for example translation transformation, scaling transformation, shear transformation, affine transformation, projective transformation, and/or other polynomials transformations that may represent variations between views of a scene in an image stream may be used to facilitate a comparison. If overlapping is identified the images may be merged. Subsequently, image frame n+2 may be compared to the current merged image for an overlapping area. This process may continue until the subsequent image frame does not share any overlapping areas with the merged image frame. At that point a new reference image frame may be defined and the process may be repeated to form a second consolidated image frame in the revised image stream. In other examples, the reference image frame may be compared to a previous image frame and/or image frames that were captured a number of frames before or after the reference image frame. Other suitable methods of consolidating image frames in an image stream may be used. Registration and merging of images may be performed by methods known in the art. In some embodiments of the present invention, an image stream may contain in the order of magnitude of 10,000 frames and for example, an order of magnitude of 100 frames may be consolidated and/or merged into one image. In other embodiments of the present invention, the image frame may be of other sizes and the number of images merged into one may typically be of other sizes. By way of example, a revised image stream may have a first consolidated image frame that may be a result of a consolidation of 50 images, a second consolidated image frame in the revised image stream may be a result of a consolidation of 200 images and a third image frame in the revised image stream may be a single frame from the original image stream. During display of the revised image stream, the streaming rate may be constant or may be variable according to one or more parameters, e.g. image parameters. According to one embodiment the consolidation is done in processing unit 14.

Figure 2:
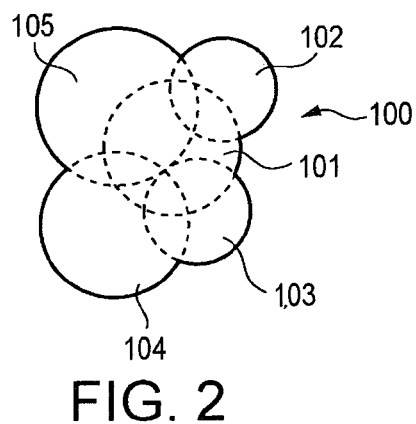
FIG. 2 shows a schematic diagram of an image constructed by consolidating five image frames according to an embodiment of the present invention.

Reference is made to FIG. 2, which shows a schematic diagram of a consolidated image constructed by consolidating five image frames from an image stream according to an embodiment of the present invention. Consolidated image 100 may be constructed by original image frames 101 to 105. In other embodiments, more or less images may be consolidated. As such redundant data may be consolidated while new data may be preserved. In FIG. 2 the image frames 101 to 105 are shown to have a circular shape. In other embodiments of the present invention, the image frames may have an alternate shape for example, square or rectangular or some other shape. The resultant shape of the consolidated image may be irregular.

Figure 3:
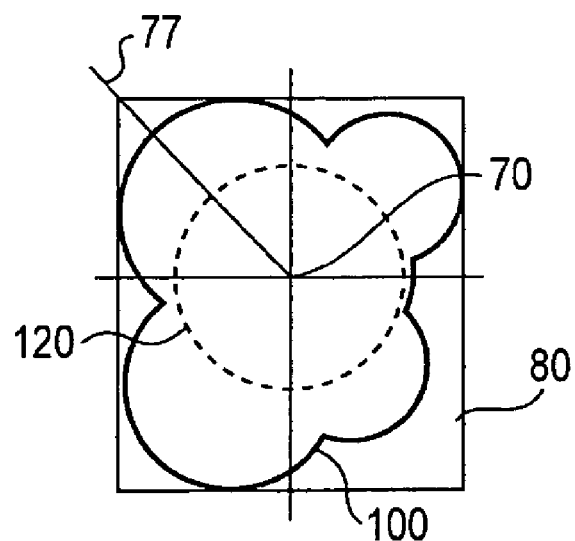
FIG. 3 shows a schematic diagram of a consolidated image with a defined central point and central area according to an embodiment of the present invention.

In some embodiments of the present invention it may be desired to deform the shape of each of the consolidated image frames to a uniform shape and size. Since each of the consolidated image frames in the image stream may result in a different shape, it may be awkward, distracting and/or uncomfortable to view an image stream, typically a moving image stream, where some of the frames have different sizes and shapes. Reference is now made to FIG. 3 showing a schematic diagram of a consolidated image with a defined central point and central area according to an embodiment of the present invention. According to some embodiments of the present invention a defined shape, for example, a rectangle 80 may be constructed to enclose a consolidated image 100. A center point 70 that may be defined as the center of rectangle 80. Around that center point a central area, for example, concentric circle 120 may be defined. According to some embodiments of the present invention, when deforming consolidated image 100 to a standard image shape and size, image data within central area, for example, circle 120 may not be deformed while image data outside of the defined central area may be deformed. In one example, the circular captured image frame may have a radius of 128 pixels and the defined central region may have a radius of 64 pixels. In other examples, the center of an image frame may vary from frame to frame, for example to correspond to an event in an image frame or stream. Adjusting the center of the frame may be implemented to stabilize the viewing of the image stream. Other suitable size and/or shape image frames and central areas may be used.

Figure 4:
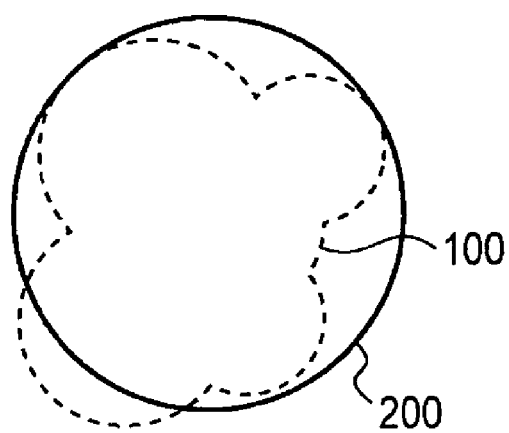
FIG. 4 shows a schematic diagram of a consolidated image deformed to a defined shape according to an embodiment of the present invention.

According to some embodiments of the present invention, deformation of the image data outside of the central area 120 may be radially from central point 70. Reference is now made to FIG. 4 showing a schematic diagram of a consolidated image deformed to a defined shape. Consolidated image frame 100 may be deformed to a shape 200. According to some embodiments of the present invention, deformation may only be performed outside central region 120 (FIG. 3). Maintaining the central portion 120 without deformation may increase the quality of the image data displayed and confine the deformation to peripheral regions that may be noticed less. Radial deformation may be performed outside of central region 120 so that a pixel along radial line 77 may be displaced to another point on radial line 77 due to the deformation. According to another embodiment a pixel along radial line may be moved away from radial line 77. Deforming the consolidated images to a standard shape and size may make for more comfortable viewing of the consolidated image stream containing consolidated images. According to embodiments of the present invention, images may be merged without cropping so as to maintain all image information captured. According to other embodiments of the present invention, consolidating images w/o cropping may have the effect of widening the field of view of the consolidated image. In some examples, deformation may include some interpolation methods, e.g. bilinear interpolation methods, bicubic interpolation methods and/or other interpolation methods known in the art.

According to some embodiments a method for shortening a movie of in vivo images. According to an embodiment of the invention a movie may be constructed of image frames taken by an autonomous in vivo imaging device (such as the capsule described above). The movie may include one or more revised frames that include a combination of original frames. The movie may be displayed, such as on a monitor as in FIG. 1. According to some embodiments a revised frame may be deformed to a predetermined size or shape. For example, a revised frame, which may include a combination of two or more original frames, may be deformed to be shaped and sized as an original frame.

It will be appreciated by persons skilled in the art that the present invention is not limited to what has been particularly shown and described hereinabove. Rather the scope of the present invention is defined only by the claims, which follow:

The invention claimed is:

1. A computer-implemented method for displaying a plurality of image frames, said method comprising:

receiving a plurality of image frames;

consolidating at least two image frames from the plurality of the image frames into a consolidated image;

defining a central area within the consolidated image;

deforming the consolidated image into a defined shape by performing radial deformation on pixels outside the central area, wherein the radial deformation comprises displacing a pixel along a radial line to another point on the radial line or away from the radial line; and displaying at least a portion of the plurality of the image frames, wherein the portion includes the consolidated image.

2. The method of claim 1 comprising displaying the portion of the plurality of the image frames as an image stream.

3. The method of claim 2 comprising regulating a streaming rate of the displaying of the image stream.

4. The method of claim 3 wherein the regulating is based on scenery displayed.

5. The method of claim 1 comprising deforming the consolidated image into a defined size.

6. The method of claim 1 comprising:

checking the plurality of the image frames for redundant information; and consolidating image frames that have redundant information.

7. The method claim 1 comprising:

confining the deformation to the peripheral region of the consolidated image.

8. The method of claim 1, wherein the plurality of the image frames is received from a transmitter within a body lumen.

9. The method of claim 1, wherein the plurality of the image frames includes image frames captured along a body lumen.

10. The method of claim 1, wherein the at least two image frames are consecutive image frames in an image stream.

11. A system for displaying a plurality of image frames, the system comprising:

a receiver configured for receiving a plurality of image frames;

a processing unit configured for consolidating the image frames with a predetermined amount of similarity into a consolidated image, defining a central area within the consolidated image and deforming the consolidated image into a defined shape by performing radial deformation on pixels outside the central area, wherein the radial deformation comprises displacing a pixel along a radial line to another point on the radial line or away from the radial line; and a display for displaying at least a portion of the plurality of the image frames, wherein the portion includes a consolidated image.

12. The system of claim 11 comprising an in-vivo imaging device for capturing the plurality of image frames from within a body lumen.

13. The system of claim 12 comprising a transmitter for transmitting image data from the in-vivo imaging device to the receiver.

14. The system of claim 11 wherein the in-vivo imaging device is a swallowable device.

15. The system of claim 11 wherein the display is for displaying a streaming display of the plurality of image frames.

* * * * *